United States Patent [19]

Ryden, Jr.

[11] 4,037,103
[45] July 19, 1977

[54] DIAMETER MEASURING SYSTEM FOR CYLINDRICAL OBJECTS

[75] Inventor: Joseph Ryden, Jr., Richland, Wash.

[73] Assignee: Exxon Research and Engineering Company, Linden, N.J.

[21] Appl. No.: 602,513

[22] Filed: Aug. 7, 1975

[51] Int. Cl.² .......................... G01N 21/30; G01J 1/00
[52] U.S. Cl. .................................... 250/341; 250/359; 250/560
[58] Field of Search ............... 250/304, 312, 224, 552, 250/578, 394, 354, 226; 307/310

[56] References Cited

U.S. PATENT DOCUMENTS

| | | | |
|---|---|---|---|
| 3,089,382 | 5/1963 | Hecht et al. | 250/226 |
| 3,365,699 | 1/1968 | Foster | 250/223 R |
| 3,428,813 | 2/1969 | Hofmeister et al. | 307/310 |
| 3,474,668 | 10/1969 | Mangan | 250/338 |
| 3,705,316 | 12/1972 | Burrous et al. | 250/552 |
| 3,724,958 | 4/1973 | Callan | 250/560 |
| 3,755,679 | 8/1973 | Otsuka | 250/552 |
| 3,772,514 | 11/1973 | Sunderland | 250/552 |
| 3,821,553 | 6/1974 | French | 250/354 |
| 3,872,306 | 3/1975 | Palmer | 250/223 R |

Primary Examiner—Harold A. Dixon
Attorney, Agent, or Firm—F. D. Paris

[57] ABSTRACT

A system for the rapid and accurate measurement of the diameter of cylindrical objects and the like, such as nuclear reactor fuel pellets. The system essentially operates on the principle that when an infrared emitter and receiver are aligned in diametrically opposed relationship such that the beam from the emitter impinges on the receiver, the output of the receiver is proportional to the amount of energy received by it. Measurement of cylindrical objects such as pellets is accomplished by passing the object to be measured between the emitter and the receiver. The beam initially is arranged so that as the object passes between the two elements, it partially blocks the beam. Those objects having different diameters or a single object of varying diameter will block more or less of the beam, thereby producing a proportional change in the receiver output which can be correlated in terms of the diameter of the object. Suitable provision is made to compensate for temperature variations in the emitter and receiver.

11 Claims, 7 Drawing Figures

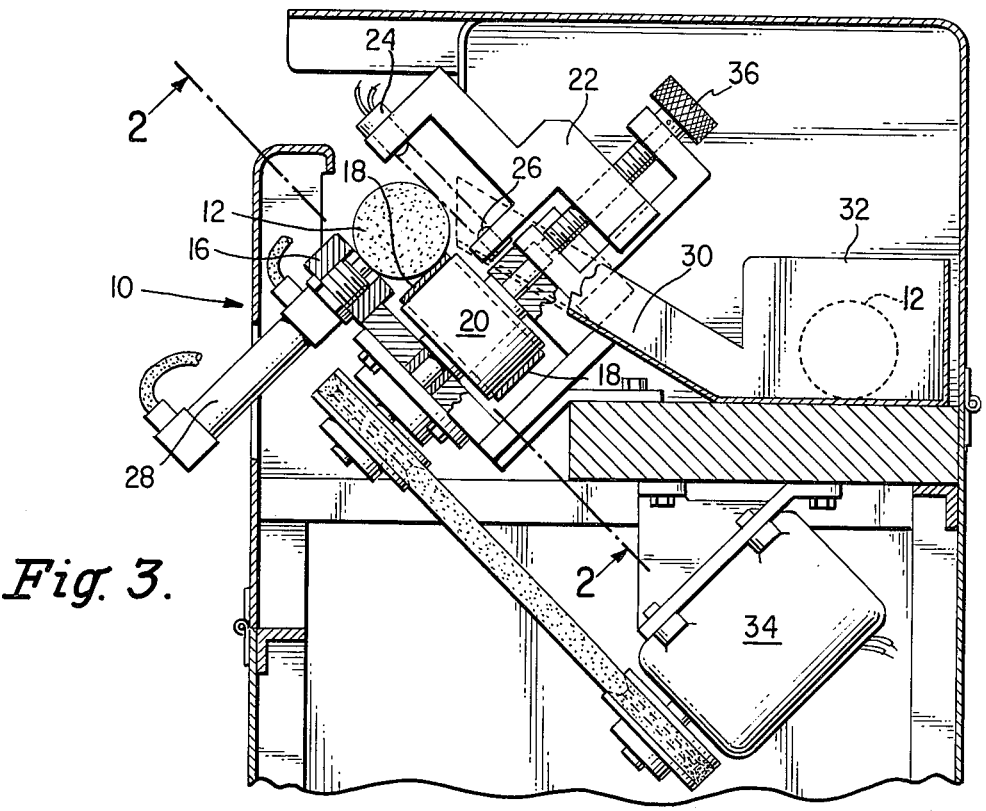
Fig. 3.
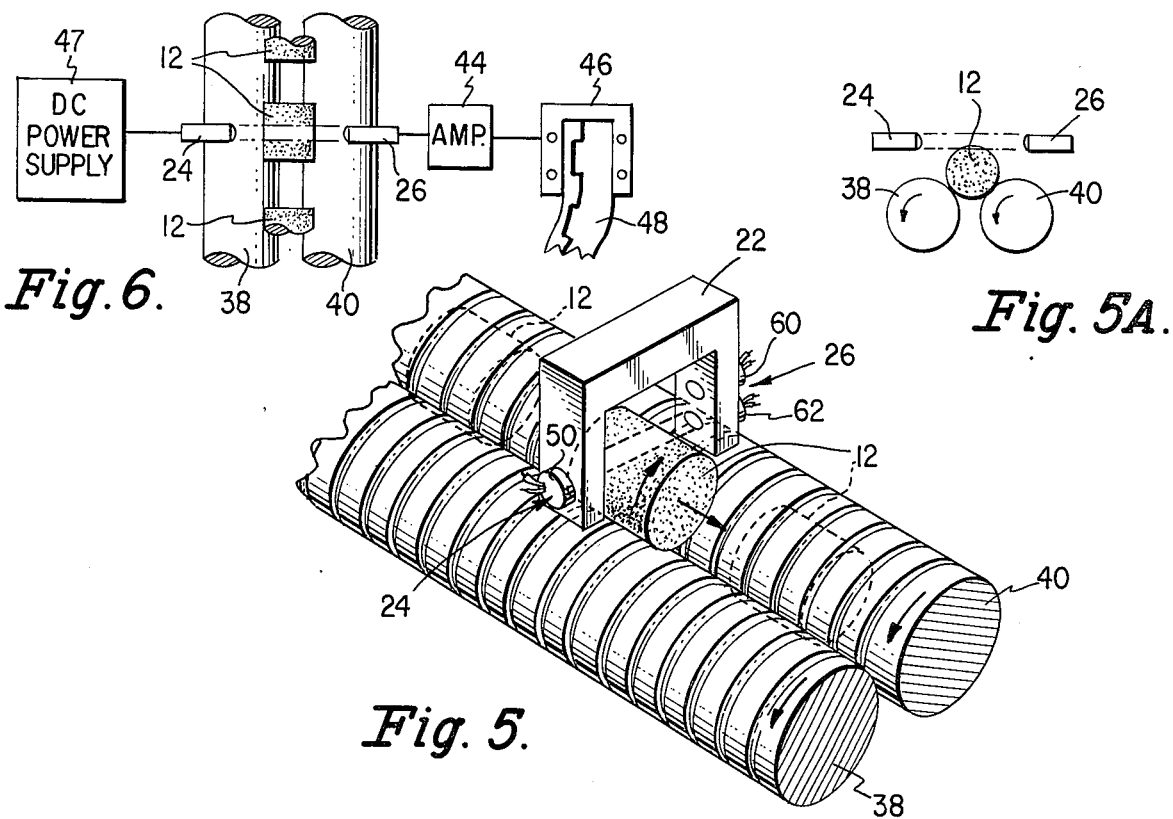
Fig. 6.
Fig. 5A.
Fig. 5.

DIAMETER MEASURING SYSTEM FOR CYLINDRICAL OBJECTS

BACKGROUND OF THE INVENTION

In the manufacture of nuclear fuel for use in fuel bundles which are incorporated into the nuclear reactors, it is important to employ fuel pellets which have uniform diameter both individually and with respect to the other fuel pellets so that the calculated power requirements and usage of the fuel bundles will be in accordance with prescribed performance standards. Thus, in the fuel bundle each of the rods containing fuel pellets of non-uniform diameter or at least diameters which vary beyond permissible limits, the amount of power produced may not be in accord with specified power ratings for fuel of a certain diameter. This will cause a difference in the life of the particular fuel rod supplying the power as well as with respect to the power curve over the life of the fuel. Thus, it is clear that it is important to make sure that the diameters of the pellets are within a permissible tolerance.

Heretofore, a technique commonly used to measure diameters of pellets and diameter profiles of a single pellet comprise an electro-mechanical system. This system uses a linear variable displacement transformer (LVDT) to make a one point measurement of the pellet diameter. Because the measurement has to be made with the pellet stationary, the system throughput is low. The system also has the disadvantage in that only a one point measurement is made.

It is important in measurement of diameters and numerous objects such as nuclear fuel pellets to have a system which measures the parameter of the pellet without the necessity of contacting the pellet, which can cause possible scratching that would result in an unsatisfactory appearance and in some cases the scratches would destroy the dimensional requirements. Further, it is important that the system provide a measurement which is very accurate and also which can provide a complete diameter profile so that various dimensional anomalies can be quickly ascertained from a suitable strip chart recording of the diameter profile of each pellet. Finally, it is important that the system be relatively inexpensive and of course reliable.

Other prior art which has been considered in connection with the subject invention include the following patents: U.S. Pat. Nos. 2,730,006 3,549,896 2,931,917 3,566,135 2,941,087 3,712,741 3,204,109 3,730,633 3,365,699 3,737,856 3,454,759.

SUMMARY OF THE INVENTION

The present invention relates to a system for the measurement of the diameter of cylindrical objects such as nuclear reactor fuel pellets, in a rapid and accurate manner and more particularly, to a system which employs an infrared emitter and infrared receiver aligned in diametrically opposed relation such that the emitter beam impinges on the receiver and the output of the receiver is proportional to the amount of energy received by it. The system measures the diameter of the pellet as it passes through the opposed emitter and receiver and blocks more or less of the beam, thereby producing a proportional corresponding change in the receiver output. The extent of change depends upon how much of the beam is blocked. The initial beam is arranged to provide for a reference or nominal diameter of the pellet and thereafter any further measurements can be compared to the known reference diameter. An electronic circuit is provided to compensate for power output changes in the emitted beam due to temperature variations and also to compensate for changes in the receiver output due to temperature variations. By employing the foregoing system in accordance with the present invention, one will have a non-contacting measurement system which will avoid any scratching of the pellets and will have exceptional stability and accurate results wherein diameter variations may be resolved to as small as ±0.00005 inch and at least better than ±0.0001 inch. In addition, by rotating the pellets as they are translated, a complete diameter profile of each pellet can be obtained. Thus, any hour-glassing, taper or other dimensional anomalies can quickly be ascertained from a strip chart recording of the pellet's diameter profile.

The foregoing and other objects and advantages of the present invention will be apparent to those skilled in the art upon reading of the following detailed description in connection with the accompanying drawings.

BRIEF DESCRIPTION OF THE DRAWINGS

FIG. 3 is an end view of the system of FIG. 1 taken substantially along the line 3—3 of FIG. 1;

FIG. 5 is an alternate embodiment of the present invention employing the same basic principles as in FIGS. 1-4, only employing a different transport system in the form of skewed rollers which transport the pellets linearly and rotatably past the measuring station;

FIG. 5a illustrates the end view of FIG. 5 showing the pellet blocking the beam; and FIG. 6 is a schematic illustration of the overall system viewed from the top.

DESCRIPTION OF THE PREFERRED EMBODIMENT

Figure 1:
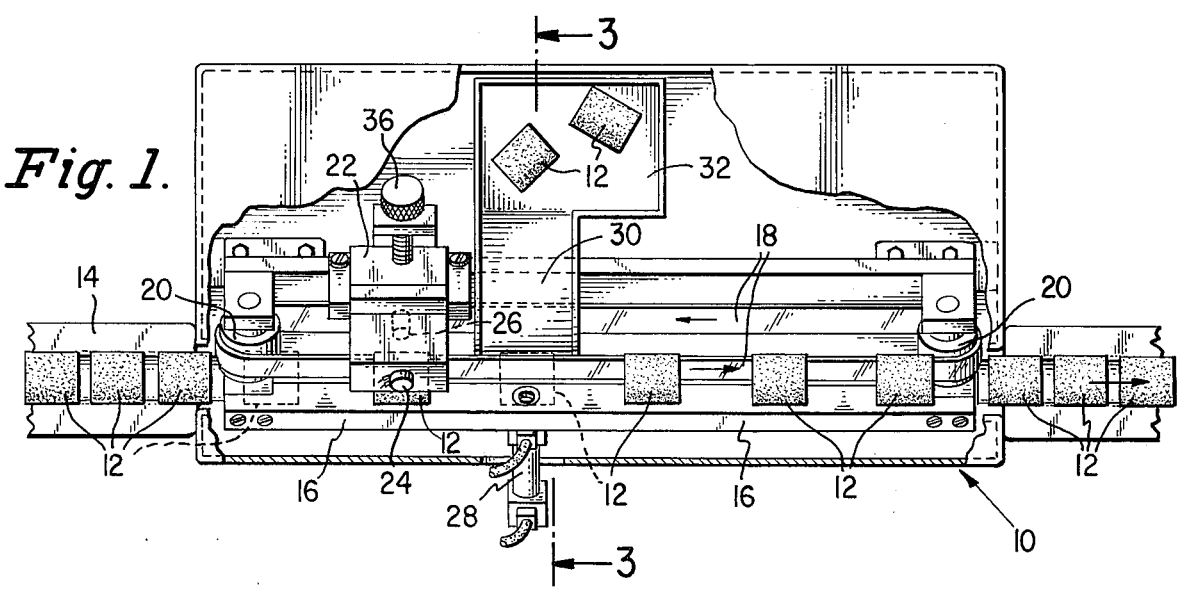
FIG. 1 is a top view of a system constructed and arranged in accordance with the present invention, illustrating the pellet diameter measurement station.
Figure 2:
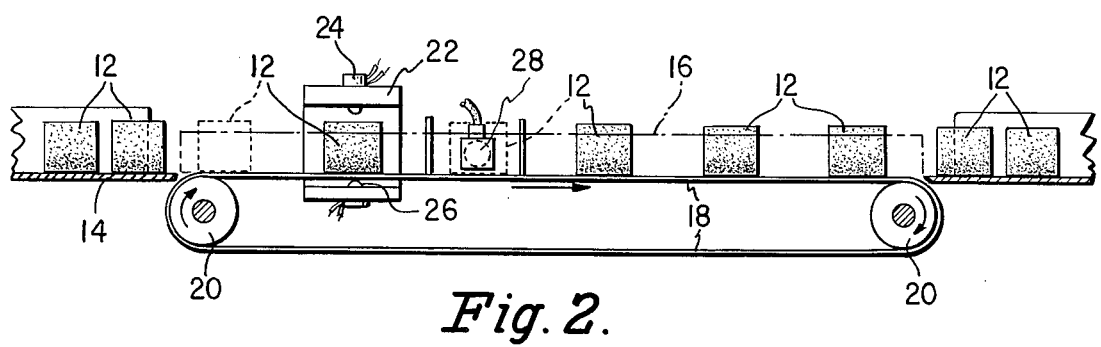
FIG. 2 is a side view of the system of FIG. 1 taken substantially along the line 2—2 of FIG. 3.

Referring now to the drawings wherein like elements and components are designated by the same reference numeral throughout the several views, there is shown in FIG. 1 a system generally designated 10 for use in measuring in a rapid and accurate fashion the diameter of cylindrical objects and more particularly nuclear reactor fuel pellets 12 in the preferred embodiment, although other similar objects also can be measured. The pellets are fed along a conveyor into an inlet guide 14 which typically comprises a trough-like channel which directs the pellets 12 into a guide channel 16 which includes a guide rail tilted in order to tangentially support a side of the fuel pellets as they are translated past a diameter measuring station by means such as a driven stainless steel belt 18. The belt is driven by a pair of pulleys 20, in a conventional manner, shown rotating in a clockwise direction so that the direction of belt travel and therefore that of the pellets is to the right as shown in FIG. 2. As the pellets are translated along the guide rail, they pass the measuring station at which is located a holder 22 for mounting an infrared emitter 24 and an infrared receiver 26. The holder typically may comprise the shape of a yoke, that is generally U-shaped, bridging the opposite sides of the belt 18 so that the pellets are translated between and through the holder with the emitter and receiver on diametrically opposing sides. A typical infrared emitter can comprise an infrared diode which is made of diffused planar gallium arsenide (e.g., Monsanto MT3). The infrared receiver typically might comprise silicon phototransistors (Monsanto MT1, MT2). While the preferred emitter is a gallium arsenide infrared device, it is also possible to employ a low power laser. The silicon phototransistors have a spectral response which is suitable either for lasers or infrared remitters and have a fast response time in the vicinity of 2 nanoseconds. The details and operation of the diameter measurement system will be explained hereinafter.

If a measurement by comparison to a standard exceeded a certain predetermined level, this would be indicative that the diameter was not within the tolerable range for the particular object, which in this case are fuel pellets being measured. Then a reject actuator 28, which does not form part of the invention but is disclosed for purposes of showing an overall environment, is automatically actuated and the pellet is caused to eject from the belt into a reject pellet chute 30 located on the opposite side of the belt from the reject actuator. Typically, the actuator would have plunger arranged to push the pellet off the belt upon receipt of an appropriate reject signal into a reject pellet chute 30. Storage tray 32 receives and stores the pellets from the pellet chute 30. Those pellets which are within the tolerance continue on the belt and are fed to the next succeeding stage for appropriate handling and disposition.

As shown in the preferred embodiment of FIG. 3, the fuel pellets are supported tangentially on one side by the guide rail 16 and tangentially on an adjacent side by the belt. An appropriate conventional drive mechanism comprising a motor 34 is shown for driving the pulleys, although various other suitable drive means can also be employed. Associated with the holder 22 for the infrared emitter and infrared receiver is an adjustment screw 36 which by appropriate manipulation can be adjusted such that the sensing head holder is appropriately adjusted with regard to the desired reference diameter of the objects being measured. The holder can move in a direction perpendicular to the path of object movement. As shown in FIG. 3, the diameter of the fuel pellet 12, if larger than that shown, will block a portion of the beam from the infrared emitter 24 which impinges on the receiver 26. The principle employed is that the infrared emitter upon activation will produce a beam of infrared energy which will be received by the emitter located diametrically opposite the emitter and in turn will produce an output in accordance with the amount of beam energy it receives. As the pellet is passed between the emitter and receiver with the beam positioned so that the pellet partially blocks the beam, those pellets having different diameters will therefore block more or less of the beam, which will produce a proportional change in the receiver output.

The belt conveyor system of FIGS. 1-3 translates the pellets only in a linear fashion. Other transport systems for the pellets can be employed such as the skewed drive roller system of FIG. 5. According to this embodiment the rollers 38, 40 are rotated, shown in a counterclockwise direction, such that the pellets will rotate in a clockwise direction and at the same time, because of the skewed relationship of the roller axes, the pellets will be caused to translate in a linear direction. The belt conveyor system is suitable when only the diameter measurement along the pellet length is desired, whereas the use of a translating and rotating system is desirable when a measurement of a complete diameter profile is desired.

By using sensitive receiving elements of the present invention for use in making diameter measurements, it is possible to obtain a substantial change in the voltage output generated for a relatively small amount of beam blockage. Since the holder is provided with an adjustment for the elevation of the infrared emitter and receiver, the height of the beam with respect to the guide rail can be regulated so that a nominal pellet diameter will block a portion of the beam which will produce a predetermined and known voltage output at the phototransistor receiver for subsequent processing by its associated electronics. More of the beam will be blocked by a pellet of a larger diameter than the reference nominal diameter which would result in a decrease in the output voltage and correspondingly, a smaller diameter pellet would block less of the beam, producing a greater output voltage. Since the sensitivity of these infrared elements (emitter and receiver) is excellent, the signal output from the emitter will be considerably larger in magnitude than any electronic noise and therefore noise will not significantly affect the accuracy of the results.

By employing a skewed roller pellet transport system, that is, one with the axis of the roller being offset with respect to each other, the pellets will rotate and move in an axial direction simultaneously. The amount of tilt or offset determines the pitch at which the pellets advance. The rollers are belt-driven from a common variable speed motor which is important for this embodiment as discussed hereinafter. This dual motion will enable obtaining a complete diameter profile of each of the pellets as it passes between the infrared emitter and receiver. As shown in FIG. 6, the emitter 24 is actuated by a conventional highly regulated DC power supply 42 which provides for a stable output. The emitted beam impinges more or less as discussed above on the infrared receiver 26 located on the opposite side of the pellet. The output from the receiver is sent to an amplifier 44 which in turn is connected to a conventional recorder 46 which records on a chart 48 the signal corresponding to the measured diameter of each of the pellets passing through the measuring station.

Figure 4:
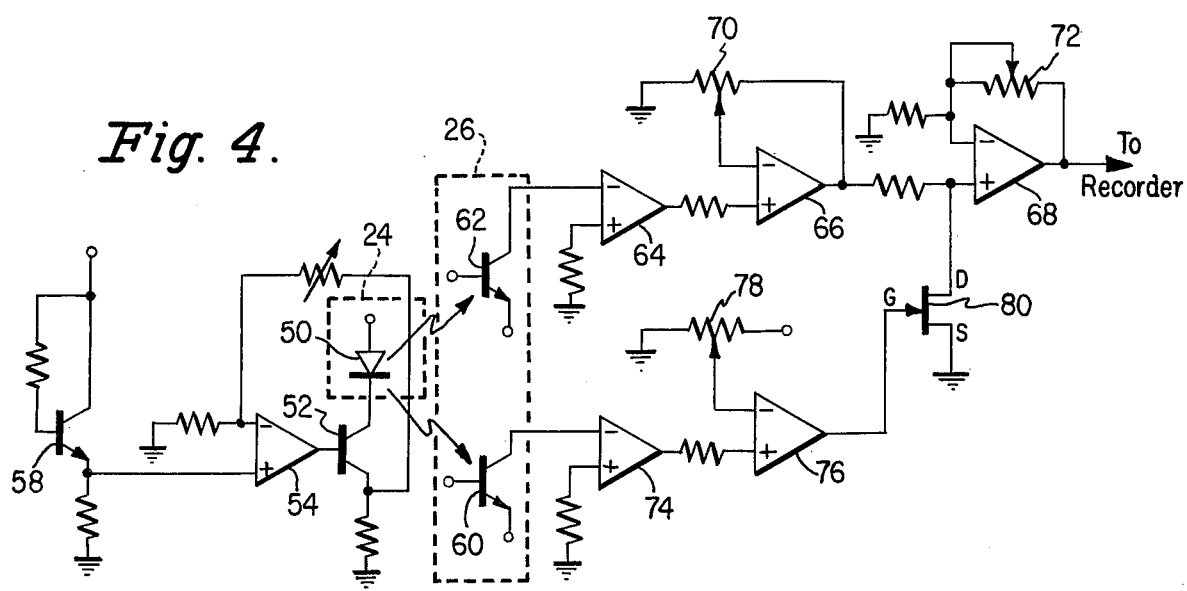
FIG. 4 is a schematic block diagram of the temperature compensating circuit in accord with the present invention.

In order to compensate for temperature variations which may be caused by ambient temperature changes, there is provided an electronic temperature compensating circuit schematically shown in FIG. 4. Thus, changes in the output of the infrared emitter 24, shown as comprising the diode 50, due to temperature variations, which may be caused by ambient temperature changes, is compensated for by providing the circuit to be described hereinafter. The diode 50 is connected in the collector of the common-emitter connected transistor amplifier 52, whose base is connected to the output of operational amplifier 54. A feedback path through variable resistor 56 is provided from the emitter of transistor 52 to the input of amplifier 54. A transistor amplifier 58 is coupled to the input of operational amplifier 54. The transistor 58 is physically mounted adjacent to the infrared emitter diode 50 and therefore is exposed to the same temperature variations as the diode. In the event that the ambient temperature increases, the power output from the diode 50 will decrease. However, the gain of the transistor 58 increases with increasing temperature and at a rate substantially the same as the output decrease of the diode 50. Thus, the increase gain of transistor 58 will cause the voltage at the base of transistor 52 to go more positive, thus, increasing current in its collector-emitter path and therefore through diode 50 which raises the output of the diode to its original value prior to any change in temperature. Preferably the infrared receiver 26 comprises a pair of phototransistors 60, 62 which detect the signal given in the form of a beam of energy from the infrared diode 50. The phototransistors are physically mounted close together, preferably one above the other as shown in FIG. 5, for example, so that the infrared beam from the diode 50 impinges on both of them. The physically located lower phototransistor 62 is designated the diameter unit and performs the diameter measurement which will be apparent from the following description. Objects of different diameters will block varying amounts of the beam from being received by the lower unit 62. The physically located uppermost phototransistor 60 does not have any of the beam energy it receives from the diode 50 blocked by the objects as it passes between the measuring station units. FIG. 4 shows the schematic circuit for the phototransistors with 62 above 60; however, the actual physical arrangement (FIG. 5) is the reverse. The upper phototransistor 60, is termed the compensator, since it functions to provide means for generating a reference signal which is used to compensate for temperature variations experienced by the diameter signal receiving phototransistor 62. The amount of energy which is received by the diameter unit 62 is amplified by transistor amplifiers 64, 66, and 68, which are connected in series and typically may comprise conventional operational amplifiers. The zero adjustment 70 which comprises a potentiometer for biasing the input of amplifier 66 is for zeroing the recorder output and the span control 72, which comprises a variable potentiometer, is connected in the feedback of the amplifier 68 for adjusting the span or range of the signal output from amplifier 68. The output from the amplifier 68 is an analog signal and suitable for presentation and recording on the conventional strip chart recorder 46 (shown schematically in FIG. 6). By adjustment of the voltage applied from potentiometer 70 to the negative input terminal of amplifier 66 the recorder output can be maintained at the beginning of the measurement at the zero reference. The compensator receiving phototransistor 60 receives energy from the infrared emitter which is not obstructed by the passing object, which in the preferred embodiment is the pellet being measured. The signal from transistor 60 is coupled to series connected amplifiers 74 and 76, the latter of which has a zero adjustment 78 similar to potentiometer 70 for amplifier 66 discussed above. The amplifier construction and arrangement for this channel is substantially identical with that for phototransistor 62. The output from the amplifier 76 is de-coupled to a field effect transistor 80 which has its drain electrode connected to the input of the amplifier 68. The aforediscussed circuits comprise an automatic gain control circuit whereby the signal output of compensator transistor 60 is utilized to control the gain of the diameter signal passing through the diameter signal channel concluding amplifiers 64, 66 and 68, because it regulates the amount of resistance presented by the drain-source circuit of the field effect transistor 80 between the input terminal of amplifier 68 and reference ground, thus controlling the amount of the signal which will pass through the amplifier 68 and regulating the gain of amplifier 68. Thus, if the ambient temperature to which the phototransistors 60 and 62 are exposed increases, then the corresponding outputs from both will increase accordingly. The signal generated at the output of amplifier 76 is of appropriate polarity (depending on whether the field effect transistor is NPN or PNP) to cause the field effect transistor 80 to alter the diameter signal output from amplifier 66 and thereby bring the signal level back to its original value as it was prior to the temperature rise. In the case of a decrease in ambient temperature the phototransistors will have correspondingly lower outputs which will result in the field effect transistor 80 conducting less and thereby present less resistance to the input circuit of amplifier 68 which will increase the gain thereof and the amplitude of the diameter signal output, increasing it to its original level.

From the foregoing it is apparent that there has been disclosed a system for measuring the diameter of cylindrical objects, particularly nuclear fuel pellets, such that the diameter measurements are obtained in a rapid and highly accurate fashion. While there has been described a preferred embodiment and various modifications of the present invention, further modifications which are within the scope of this invention will become apparent to those skilled in the art. Accordingly, in order to determine the true scope and spirit of the present invention, reference should be made to the appended claims.

What is claimed is:

1. A system for the rapid and accurate measurement of a physical parameter such as the diameter of objects, comprising in combination: a diameter measurement station comprising emitter means for impinging a beam of energy on receiver means aligned diametrically opposite said emitter means, said emitter means comprising an infrared diode, said receiver means having an output proportional to the amount of beam energy received thereby; means for translating said objects in a transport channel past said emitter and receiver means arranged on opposite sides of the translating means; and electronic circuit means for receiving the output of said receiver means and compensating for temperature variations in the outputs of said emitter and receiver means and providing an output signal representative of said parameter of said objects, said electronic circuit means comprises transistor amplifier means and an output transistor connected to the output of said amplifier means and including said infrared diode in its collector circuit and feedback circuit means connected between the emitter of said transistor and the input of said amplifier means; said receiver means comprising first and second phototransistors responsive to said infrared diode and connected in first and second amplifying channels, said second amplifying channel providing a signal to compensate for variations in the signal processed by said first amplifying channel due to temperature variations in the output from said first phototransistor.

2. The system of claim 1 wherein said receiver means is arranged relative to said emitter means for providing an output reference signal which corresponds to the desired dimension when an object corresponding to said desired dimension passes said emitter and receiver means of said objects with which subsequent measurements of said object dimension are compared.

3. The system of claim 1 wherein said first and second phototransistors are mounted proximate each other with said first one of said phototransistors located vertically above the second of said phototransistors, said electronic circuit means connected with said first and second phototransistors to compensate for temperature variations.

4. The system of claim 1 wherein said first channel includes a first amplifier means and automatic gain control means connected to said second phototransistor and to the input of said first amplifier means for controlling the gain thereof.

5. The system of claim 4 wherein said automatic gain control circuit means includes a field effect transistor.

6. A system for measuring the diameter of a cylindrical object such as nuclear fuel pellets, comprising in combination: a guide channel for directing said fuel pellets along a predetermined path of movement; a measuring station including holder means for supporting infrared emitter and receiver means on diametrically opposite sides of the said guide channel; drive means for transporting said fuel pellets past said holder means and along said guide channel, said guide channel being tilted for tangentially supporting said fuel pellets on one side thereof; said emitter and receiver means being aligned such that said fuel pellets partially block a beam of energy extending therebetween; and circuit means connected with said emitter and receiver means to compensate for temperature variations in the outputs thereof, said circuit means including transistor means connected with said emitter means for increasing the gain thereof as said emitter means output varies due to temperature variations, said receiver means comprising first and second phototransistors and amplifier means connected with a first phototransistor means for processing the output from said first phototransistor to produce a signal representative of the diameter of said fuel pellet passing between said emitter and receiver means, said second phototransistor producing a signal which compensates for temperature variations in the diameter signal processed by said first phototransistor and said amplifier means connected therewith.

7. The system of claim 6 wherein said transistor and said emitter means are mounted proximate each other and said first and second phototransistors are mounted one above the other in said holder means.

8. The system of claim 6 including first and second signal channels, said first channel including said first phototransistor and said second channel including said second phototransistor.

9. The system of claim 6, wherein said emitter means comprises an infrared diode.

10. The system of claim 1 wherein the translating means comprises a belt driven by pulleys for translating said objects linearly.

11. A system for rapid and accurate measurement of a dimension such as the diameter of objects, comprising in combination: a diameter measurement station comprising emitter means for impinging a beam of energy on receiver means aligned diametrically opposite said emitter means, said receiver means having an output proportional to the amount of beam energy received thereby; means for translating said objects in a transport channel past said emitter and receiver means arranged on opposite sides of the translating means such that variation in the desired object dimension varies the amount of energy received by said receiver means; and electronic circuit means for receiving the output of said receiver means and compensating for temperature variations in the outputs of said emitter and receiver means and providing an output signal representative of said dimension of said object and wherein the translating means comprises a pair of skewed rollers having longitudinal axes extending in the direction of movement of said objects, for causing said objects to rotate and translate linearly.

* * * * *